(No Model.)
J. O. ELLINGER.
COUPLING FOR SHAFTS AND LIKE PURPOSES.
No. 428,808. Patented May 27, 1890.
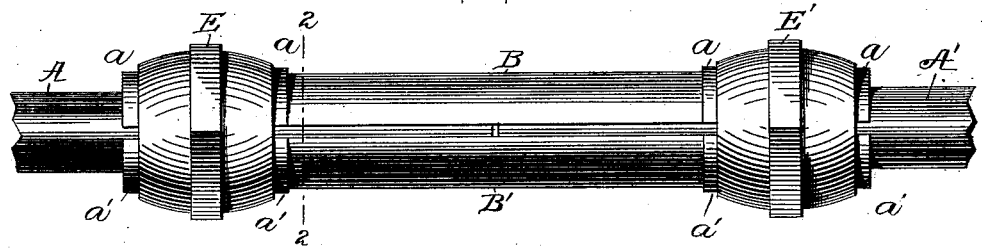
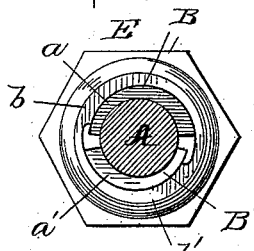
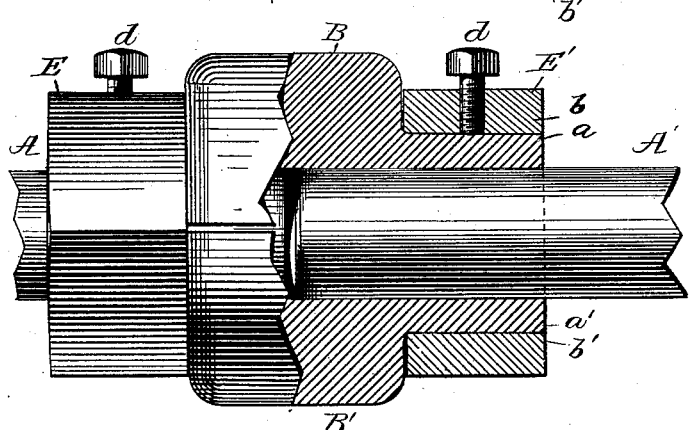
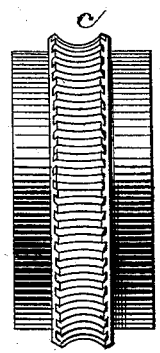
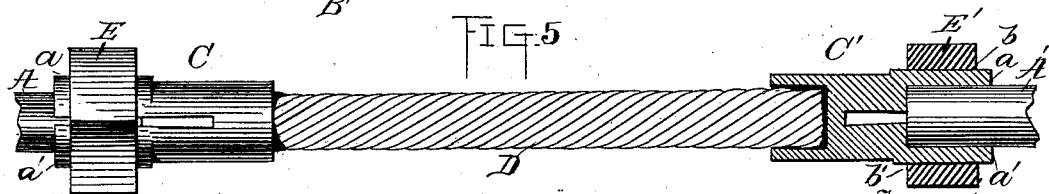
Witnesses
E. C. Rowland
W. Pelzer
Inventor
Julian O. Ellinger
By his Attorneys
Dyer & Seely

UNITED STATES PATENT OFFICE.

JULIAN O. ELLINGER, OF NEW YORK, N. Y.

COUPLING FOR SHAFTS AND LIKE PURPOSES.

SPECIFICATION forming part of Letters Patent No. 428,808, dated May 27, 1890.

Application filed September 21, 1889. Serial No. 324,642. (No model.)

*To all whom it may concern:*

Be it known that I, JULIAN O. ELLINGER, a citizen of the United States, residing at the city of New York, in the county and State of New York, have invented a certain new and useful Improvement in Couplings for Shafts and for Like Purposes, of which the following is a specification.

The object I have in view is to produce a coupling for shafts and for like purposes which will be simple in construction, can be readily and quickly applied, and will be reliable and efficient in use.

My coupling is intended not only for shafts, but is also particularly applicable to rod or shaft like electrical conductors, since the great gripping force which constitutes a feature of its action is well adapted for forming and preserving good electrical contact. It may also be applied to all uses for which a shaft-coupling is adapted, such as the coupling of rods, pipes, &c.

My coupling is composed of a clamping-sleeve and two surrounding compression collars or nuts. The clamping-sleeve is split longitudinally from end to end upon one or on opposite sides, and the sections of shafting or other objects to be coupled meet within the sleeve, which is bored out to fit them snugly, whether of the same size or of different sizes, the longitudinal split or splits permitting the compression of the sleeve upon the abutting shafts, rods, pipes, or the like. If the shafts or other objects are not to meet within the sleeve, (a construction applicable to one form of connection for electrical conductors,) the sleeve may become a solid body, either rigid or flexible, and be provided with split cups at its ends, which receive the ends of the rod-like conductors to be united. The opposite ends of the clamping-sleeve are constructed to form cams on their outer surfaces. There are preferably two cams on each end of the sleeve, these being each formed, preferably, as semicircles from centers eccentric in the same degree to the center of the bore of the sleeve, but in opposite directions, so that two equiangular spirals will be produced, the highest point of one spiral terminating at the lowest point of the other spiral.

Upon the ends of the sleeve and surrounding the cams are two compression collars or nuts, which are formed externally in any suitable manner for the application of power of rotation thereto, either by a hand wrench-bar or by a worm or other gearing. These compression-collars are constructed to present internally similar but reverse cam-faces to those upon the ends of the sleeve, so that by a partial rotation of the compression-collars the clamping-sleeve will be forced upon the sections of shafting or the like inclosed by it with a gripping action of great power, and such sections will be securely and effectively coupled, so as to be capable of transmitting great strain without danger of separation. It is only necessary to provide a sufficient weight of metal in the clamping-sleeve and compression-collars to give the coupling strength to transmit power up to the limit of capacity of the shafts themselves, since the gradual rise of the equiangular spiral cams gives a gripping action which, if set with sufficient initial force, will hold up to the breaking-point of the parts.

In uniting electrical conductors the powerful compressing action of the spiral cams enables good electrical contacts to be formed and maintained between the clamping-sleeve and the rod or shaft like conductors which are united by it.

The compression-collars may be provided with set-screws; but these are not essential.

I prefer that the cams at one end of the coupling should be set in the opposite direction to those at the other end of the coupling, so that the compression-collars will be rotated in opposite directions to grip the sleeve; but this, also, is not essential.

In the accompanying drawings, forming a part hereof, Figure 1 is a side elevation of the coupling shown as applied to the uniting of electrical conductors; Fig. 2, a cross-section on line 2 2 in Fig. 1; Fig. 3, a side elevation and partial section of the coupling applied to shafting; Fig. 4, an elevation of a compression-collar, showing it formed as a worm-wheel; and Fig. 5 is an elevation and partial section of the coupling as applied to a flexible coupling for electrical conductors.

Like letters denote corresponding parts in all the figures.

A A' represent the sections of shafting, rods, pipes, electrical conductors, and the like intended to be coupled together. The clamping-sleeve of the coupling is preferably made in two longitudinal parts B B', as shown in Figs. 1, 2, and 3, although it may be formed of two split cups C C', joined together by a solid body D, as shown in Fig. 5. Each end of the sleeve is provided with two spiral cams $a\ a'$.

E E' are the two compression collars or nuts surrounding the cams at the opposite ends of the clamping-sleeve, and having internal cam-faces $b\ b'$, which are the reverse of the cams $a\ a'$. The collars E E' may have angular exteriors to form nut-faces for turning, or they can be provided with gear-teeth $e$, as in Fig. 4, for the same purpose.

Set-screws $d$ may be provided for assisting in holding the collars after they are set.

What I claim is—

1. In a coupling for shafts and for like purposes, the combination, with a split clamping-sleeve provided with external cams at its opposite ends, of compression-collars having internal reverse cams and adapted to surround and engage the cams of the sleeve and to clamp such sleeve upon the ends of the shaft or other sections to be coupled, substantially as set forth.

2. In a coupling for shafts and for like purposes, the combination, with a split clamping-sleeve provided with two equiangular spiral cams at each end thereof, of compression-collars having internal reverse cams and adapted to surround and engage the cams of the sleeve and to clamp such sleeve upon the ends of the shaft or other sections to be coupled, substantially as set forth.

3. In a coupling for shafts and for like purposes, the combination, with a clamping-sleeve divided longitudinally into two parts and provided with two equiangular spiral cams at each end thereof, of compression-collars having internal reverse cams and adapted to surround and engage the cams of the sleeve and to clamp such sleeve upon the ends of the shaft or other sections to be coupled, substantially as set forth.

This specification signed and witnessed this 28th day of August, 1889.

JULIAN O. ELLINGER.

Witnesses:
D. H. DRISCOLL,
WILLIAM PELZER.